United States Patent [19]
Shen

[11] Patent Number: 5,937,410
[45] Date of Patent: Aug. 10, 1999

[54] METHOD OF TRANSFORMING GRAPHICAL OBJECT DIAGRAMS TO PRODUCT DATA MANAGER SCHEMA

[75] Inventor: Hwa N. Shen, Brookfield, Wis.

[73] Assignee: Johnson Controls Technology Company, Plymouth, Mich.

[21] Appl. No.: 08/951,331

[22] Filed: Oct. 16, 1997

[51] Int. Cl.$^6$ .................................................. G06F 17/30
[52] U.S. Cl. ............................................................. 707/103
[58] Field of Search ................................... 707/103, 101, 707/100

[56] References Cited

U.S. PATENT DOCUMENTS

| | | | |
|---|---|---|---|
| 4,989,132 | 1/1991 | Mellender et al. | 395/705 |
| 5,437,027 | 7/1995 | Bannon et al. | 707/103 |
| 5,596,746 | 1/1997 | Shen et al. | 707/101 |
| 5,659,723 | 8/1997 | Dimitrios et al. | 707/103 |

*Primary Examiner*—Thomas G. Black
*Assistant Examiner*—Sanjiv Shah
*Attorney, Agent, or Firm*—Quarles & Brady

[57] ABSTRACT

The present invention provides a method, and associated system, for converting object oriented models into an actual operable database. The method and system automatically converts object oriented models into inputs that are compatible with a target product data manager platform. Errors are detected during the conversion process, thereby allowing the PDM designer to correct the errors before actual PDM platform implementation. The method and system of the present invention generate ancillary outputs that further enhance the usefulness of the method and system. Errors and inconsistencies between the object oriented model and the PDM platform can thus more easily be tracked, thereby enhancing the integrity of the resulting PDM database.

17 Claims, 11 Drawing Sheets

FIG. 6

LOGICAL MODEL

```
logical_models (list unit_reference_list
    (object Class "Refrigeration"
        quidCls          "33B3F64A0164"
        superclasses     (list inheritance_relationship_list
            (object inheritance_Relationship
                quidScl         "33B3F810021B"
                supplier        "Product"
                quidSclu        "33B3F64D033F"))
        class_attributes    (list class_attribute_list
            (object ClassAttribute "openTemperature"
                quidAtb         "33B3F70B0284"
                exportControl   "Implementation")
            (object ClassAttribute "closeTemperature"
                quidAtb         "33B3F71D030C"
                exportControl   "Implementation")
            (object ClassAttribute "bulbLength"
                quidAtb         "33B3F72500BE"
                type            "float"
                exportControl   "Implementation")
            (object ClassAttribute "bulbWidth"
                quidAtb         "33B3F72D0250"
                type            "float"
                exportControl   "Implementation")))
    (object Class "Valve"
        quidCls          "33B3F64B00D9"
        superclasses     (list inheritance_relationship_list
            (object Inheritance_Relationship
                quidScl         "33B3F81800AA"
                supplier        "Product"
```

CLASS FILE

```
"33B3F64A0164"I"Refrigeration"II"33B3F64D033F"I
"33B3F64B00D9"I"Valve"II"33B3F64D033F"I
"33B3F64B03A0"I"Actuator"II"33B3F64D033F"I
"33B3F64C0185"I"Pneumatic"II"33B3F64B03A0"I
"33B3F64C0351"I"Electrical"II"33B3F64B03A0"I
"33B3F64D033F"I"Product"III
```

FIG. 7

ATTRIBUTE FILE

```
"33B3F70B0284"I"openTemperature"II"33B3F64A0164"I
"33B3F71D030C"I"closeTemperature"II"33B3F64A0164"I
"33B3F72500BE"I"bulbLength"II"33B3F64A0164"I"float"
"33B3F72D0250"I"bulbWidth"II"33B3F64A0164"I"float"
"33B3F75E019D"I"bodyType"II"33B3F64B00D9"I"float"
"33B3F7CF00EB"I"size"II"33B3F64B00D9"I"int"
"33B3F8F30040"I"springRating"II"33B3F64B03A0"I"int"
"33B3F8630210"I"positionerAvailable"II"33B3F64C0185"I"int"
"33B3F883018A"I"voltage"II"33B3F64C0351"I"int"
"33B3F68000DF"I"productCode"II"33B3F64D033F"I"int"
```

FIG. 8

ASSOCIATION FILE

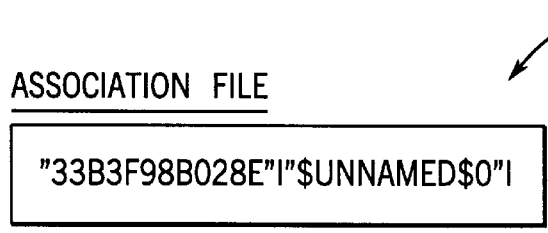

"33B3F98B028E"l"$UNNAMED$0"l

FIG. 9

ROLE FILE

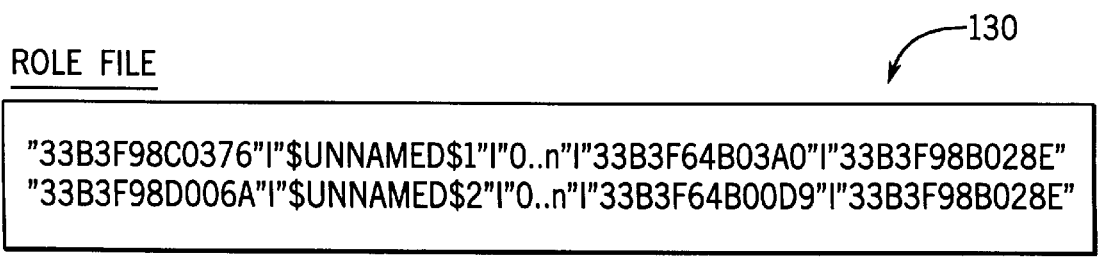

"33B3F98C0376"l"$UNNAMED$1"l"0..n"l"33B3F64B03A0"l"33B3F98B028E"
"33B3F98D006A"l"$UNNAMED$2"l"0..n"l"33B3F64B00D9"l"33B3F98B028E"

FIG. 10

RELATION FILE

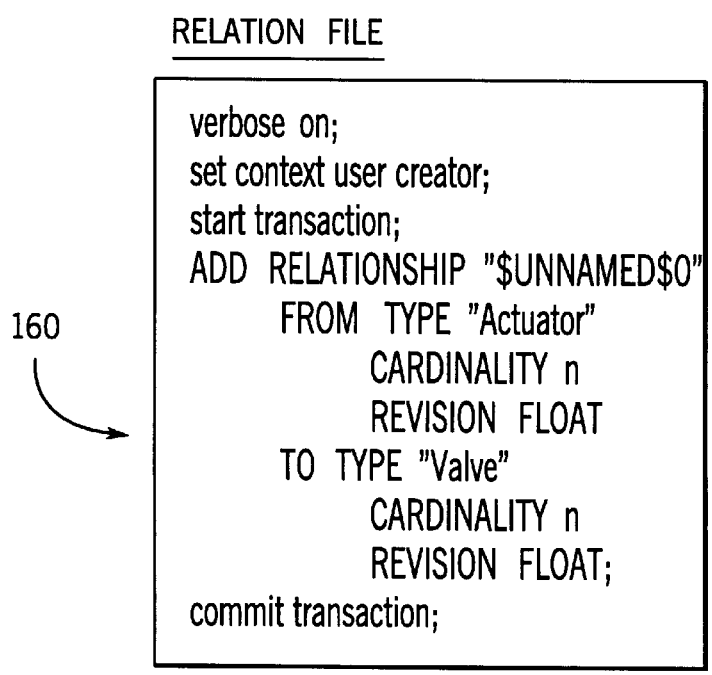

160

```
verbose on;
set context user creator;
start transaction;
ADD RELATIONSHIP "$UNNAMED$0"
    FROM TYPE "Actuator"
        CARDINALITY n
        REVISION FLOAT
    TO TYPE "Valve"
        CARDINALITY n
        REVISION FLOAT;
commit transaction;
```

FIG. 13

ATTRIBUTE FILE

```
verbose on;
set context user creator;
start transaction;
ADD  ATTRIBUTE  "Valve_size"
     TYPE  "int";
ADD  ATTRIBUTE  "Valve_bodyType"
     TYPE  "float";
ADD  ATTRIBUTE  "Refrigeration_openTemperature"
     TYPE  "string";
ADD  ATTRIBUTE  "Product_productCode"
     TYPE  "int";
ADD  ATTRIBUTE  "Pneumatic_positionerAvailable"
     TYPE  "int";
ADD  ATTRIBUTE  "Refrigeration_bulbWidth"
     TYPE  "float";
ADD  ATTRIBUTE  "Electrical_voltage"
     TYPE  "int";
ADD  ATTRIBUTE  "Actuator_springRating"
     TYPE  "int";
ADD  ATTRIBUTE  "Refrigeration_bulbLength"
     TYPE  "float";
ADD  ATTRIBUTE  "Refrigeration_closeTemperature"
     TYPE  "string";
commit transaction;
```

TYPE FILE

```
verbose on;
set context user creator;
start transaction;
ADD TYPE "Product"
        ATTRIBUTE "Product_productCode"
        ABSTRACT false;
ADD TYPE "Actuator"
        ATTRIBUTE "Actuator_springRating"
        DERIVED "Product"
        ABSTRACT false;
ADD TYPE "Pneumatic"
        ATTRIBUTE "Pneumatic_positionerAvailable"
        DERIVED "Actuator";
ADD TYPE "Valve"
        ATTRIBUTE "Valve_bodyType",
                "Valve_size"
        DERIVED "Product";
ADD TYPE "Electrical"
        ATTRIBUTE "Electrical_voltage"
        DERIVED "Actuator";
ADD TYPE "Refrigeration"
        ATTRIBUTE "Refrigeration_openTemperature",
                "Refrigeration_closeTemperature",
                "Refrigeration_bulbLength",
                "Refrigeration_bulbWidth"
        DERIVED "Product";
commit transaction;
```

LOG FILE

```
ERROR: Unnamed relationship between following classes
        <"Actuator">    <"Valve">
WARNING: No description for class <"Pneumatic">
WARNING: No description for class <"Actuator">
WARNING: No description for class <"Valve">
WARNING: No description for class <"Product">
WARNING: No description for class <"Electrical">
WARNING: No description for class <"Refrigeration">
WARNING: No attribute description for class <"Pneumatic">
        <"positionerAvailable">
WARNING: No attribute description for class <"Actuator">
        <"springRating">
WARNING: No attribute description for class <"Valve">
        <"bodyType">
        <"size">
WARNING: No attribute description for class <"Product">
        <"productCode">
WARNING: No attribute description for class <"Electrical">
        <"voltage">
WARNING: No attribute description for class <"Refrigeration">
        <"openTemperature">
        <"closeTemperature">
        <"bulbLength">
        <"bulbWidth">
WARNING: Attribute domain not set for class <"Refrigeration">
        <"openTemperature">
        <"closeTemperature">

1 Error(s) Detected
18 Warning(s) Detected
```

METHOD OF TRANSFORMING GRAPHICAL OBJECT DIAGRAMS TO PRODUCT DATA MANAGER SCHEMA

BACKGROUND OF THE INVENTION

TECHNICAL FIELD

The present invention relates generally to computer database structures, and more particularly to a method of transforming conceptual database models into actual database implementations, and that detects and corrects conversion errors during the conversion process.

DISCUSSION

Object oriented models have become a powerful mechanism for abstracting, documenting and communicating system concepts during information system development. The object oriented models, which are highly conceptual, allows a programmer to focus on database objects and the relationships between the objects without the need to focus on implementation of the database. For example, object oriented models are extremely useful in modeling classes, such as entities and associated attributes of the entities, and association and inheritance relationships among the classes in the development of product data manager (PDM) applications.

While object oriented models are useful for the design and development of databases as described above, the models must be transformed into detailed PDM schemas for actual implementation. Conventional software packages, such as Rational Software Corporation's Rational Rose object oriented modeling product, and Adra Systems Inc.'s Matrix product data manager, are two commercially available software packages that address the graphical object model conceptualization and PDM system respectively. This invention addresses specifically the transformation of the graphical object oriented model into PDM schemes. Specifically, because of the contrasting nature of the object oriented models and PDM schemas, i.e., conceptual models versus actual implementation, the transformation from conceptual object oriented models to PDM schemas is error prone and is dependent on the target PDM platform.

This invention details a method of maintaining consistency between object oriented models and PDM schemas and that detects both actual and potential errors during the conversion process. There is also a need for a method of further enhancing the usefulness of the transformation methodology to provide a user with further design options.

SUMMARY OF THE INVENTION

Accordingly, the present invention provides a method, an associated system, for converting object oriented models into an actual operable database. The method and system automatically converts object oriented models into inputs that are compatible with the target product data manager. As a result, many errors can be detected during the conversion process, thereby allowing the PDM designer to correct the errors before actual PDM implementation. Further, the method and system of the present invention generates ancillary outputs that further enhance the usefulness of the method and system. Errors and inconsistencies between the object oriented model and the PDM database can thus more easily be tracked, thereby enhancing the integrity of the resulting PDM database.

More particularly, the present invention provides a method of constructing a database from the graphical object model, including extracting and repairing the logical model from the graphical object modular output; detecting actual and potential errors in the model; repairing the detected errors; compiling and transforming the logical model to a target PDM database platform.

According to another embodiment, the present invention provides a database constructor. The constructor includes a data input through which data indicative of relationships among database objects is input. An object modeler generates an object model of the database from the data. A compiler transforms the object model database into a hierarchial database model. An error detection and warning file is generated, indicative of actual and potential errors in the database detected during the conversion process. The output also outputs ancillary files that further operate to maintain consistency between the object model and the hierarchial model. The data output also outputs the actual database scripts necessary for implementation.

BRIEF DESCRIPTION OF THE DRAWINGS

FIG. 6 is a partial display extract of a logical portion of the object model of FIG. 5;

FIG. 7 is a class file for the object diagram of FIG. 5;

FIG. 8 is an attribute file for the object diagram of FIG. 5;

FIG. 9 is an association file for the object diagram of FIG. 5;

FIG. 10 is a role file for the object diagram of FIG. 5;

FIG. 11 is an attribute script file for the target product data manager;

FIG. 12 is a type script file for the target product data manager platform;

FIG. 13 is a relationship script file for the target product data manager platform; and FIG. 14 is an error file created during the transformation of the object diagram to the product data manager platform in accordance with the methodology of the present invention.

DETAILED DESCRIPTION OF THE PREFERRED EMBODIMENTS

Figure 1:
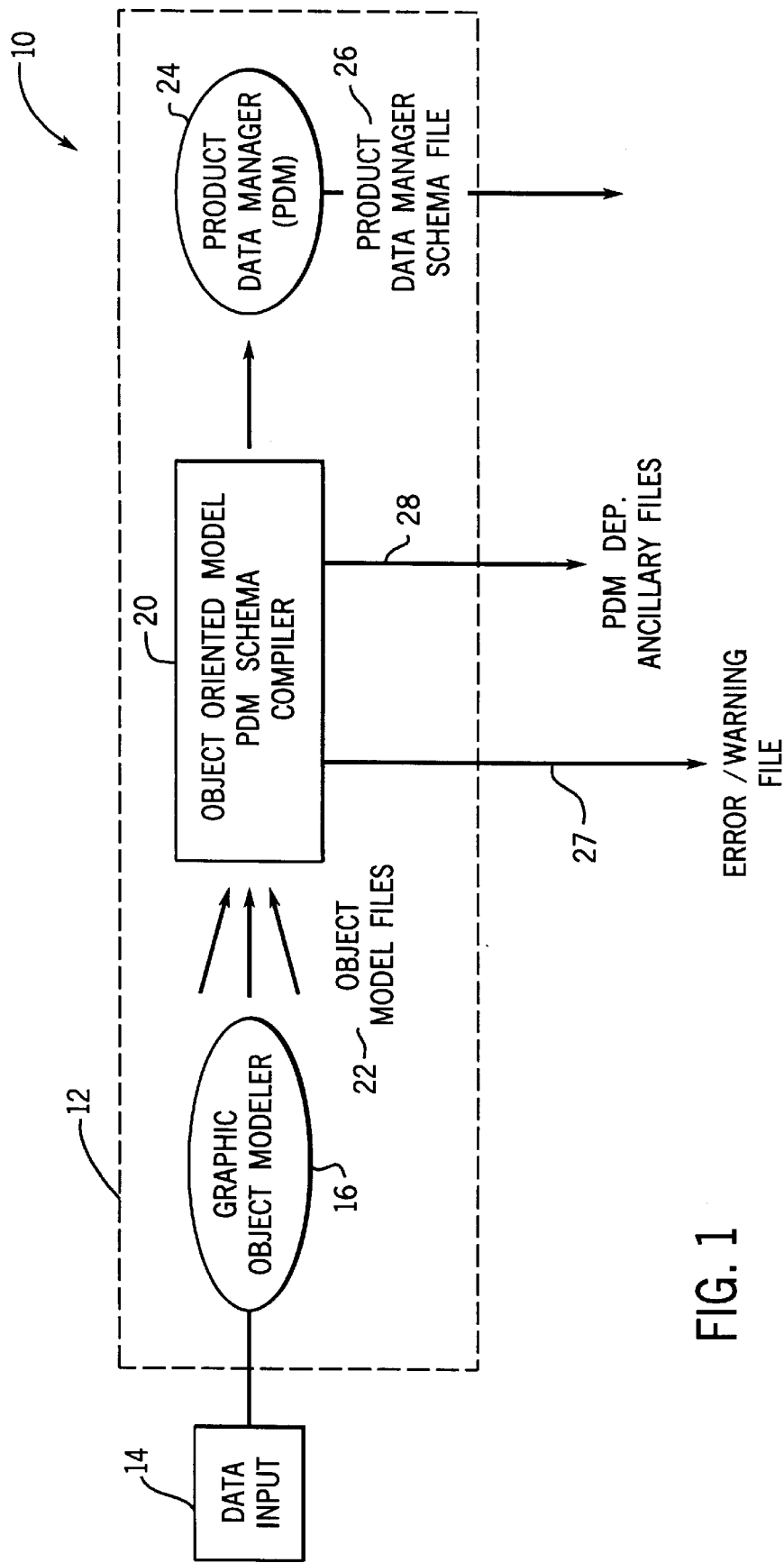
FIG. 1 is a block schematic diagram of the database construction system of the present invention.

Referring to the drawings, FIG. 1 illustrates a database generator system 10 incorporating the methodology of the present invention. The system 10 is preferably implemented in an environment 12, which could be, for example a UNIX environment or in a personal computer that is a Windows '95 or higher based machine having an Intel Pentium processor. The system 10 bridges the gap between graphical object oriented (OO) models, which are highly conceptual in nature, and product data manager (PDM) schemas, which are implementation specific. The system converts (OO) models into inputs that are compatible with the target PDM platform in a manner that detects errors that would go otherwise undetected by conventional transformation processes. The system also allows ancillary outputs to be generated to further enhance the usefulness of the transformation process.

Still referring to FIG. 1, the system 10 implemented within the environment 12 receives data indicative of identified relationships among database objects from data input 14 such as a computer drawing program. The drawing program generates a file that is subsequently input and processed by a graphic object modeler 16. The graphic object modeler 16 is preferably a commercially available modeling product, such as Rational Software Corporation's Rational Rose (OO) modeling product. The graphic object modeler in turn is linked to a compiler 20 that implements the transformation methodology in accordance with a preferred embodiment of the present invention. The compiler 20 processes object model files 22 generated by the graphic object modeler 16 to convert the files into a database platform files for use in a database platform, such as a product data manager (PDM) platform 24, in the form of product data manager schema scripting files 26. In addition, the compiler 20 generates error and warning files 27 that indicate inconsistencies detected during the conversion process, and outputs additional ancillary files 28, discussed in more detail below, that further aid the system user in developing the database platform.

Figure 2:
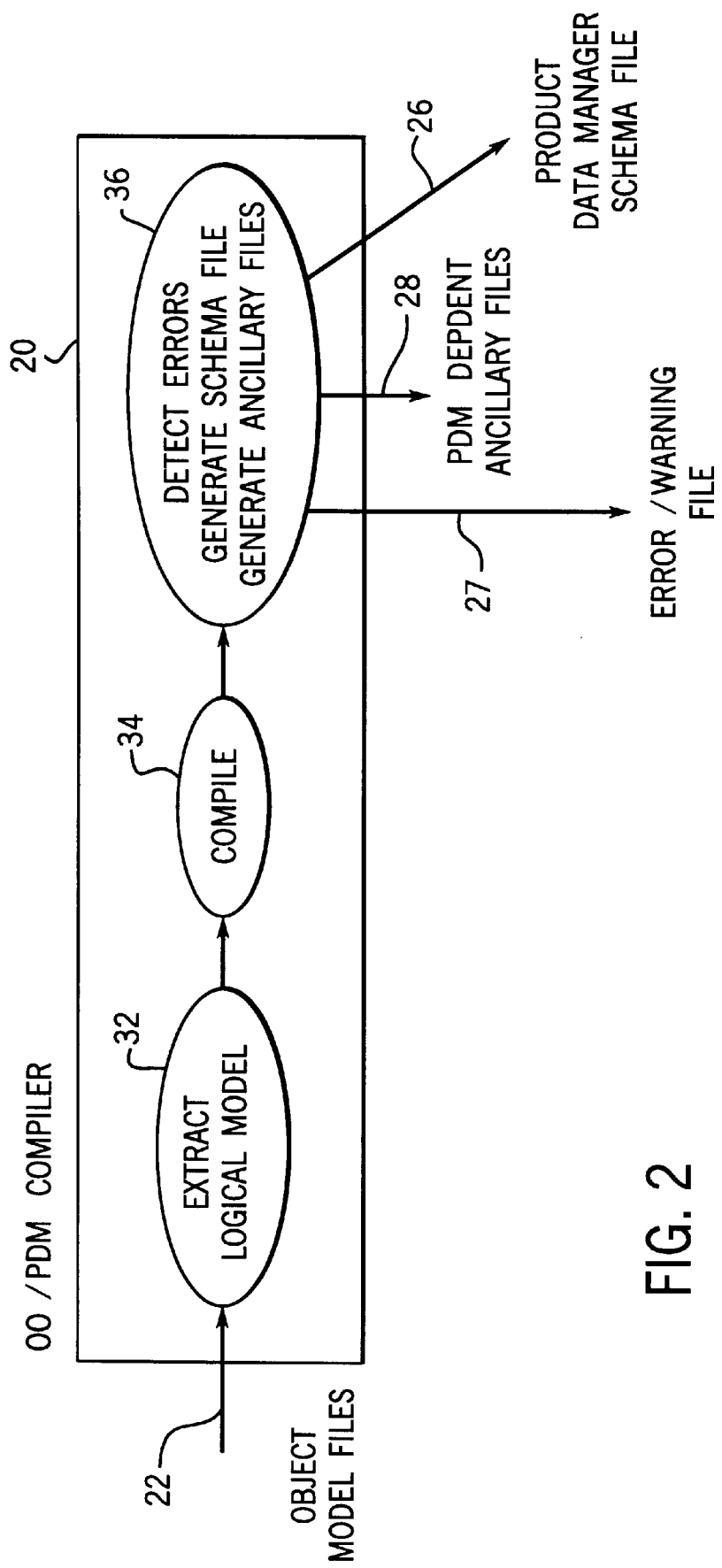
FIG. 2 is a block schematic diagram of the object oriented model product data manager compiler shown in FIG. 1.

Referring to FIG. 2, the (OO)/PDM compiler 20 of FIG. 1 is shown in more detail. The compiler 20 receives object model files at 30, and is programmed to include a model extractor, which extracts a logical (OO) model, as indicated at 32. The model extractor 32 outputs the extracted logical model to a logical model compiler 34. The logical model compiler 34 compiles the logical model into recognizable entities and relationships that are amenable for further processing, as will be described below in more detail. Once the compiler has compiled the logical model, it outputs the logical model to a generator 36. The generator 36 takes the logical model files and transforms files to PDM schema files 26 for use in a target PDM platform. In addition, the generator also detects errors in the compiled logical model, and correspondingly generates error/warning files, as indicated at 27. In addition, the generator generates ancillary files, as indicated at 28, to further assist PDM downline processing. The ancillary files may include revision information that assist in maintaining version control and consistency. For example, as the object oriented model is revised in response to changing needs, t,e incremental changes from the previous version, both at the object model and PDM database schema levels can be outputted to the ancillary files. This information can be used to incrementally update the PDM schema to the latest release. Conversely, this information can be used to roll back the current version of the PDM schema to the previous release.

Figure 3:
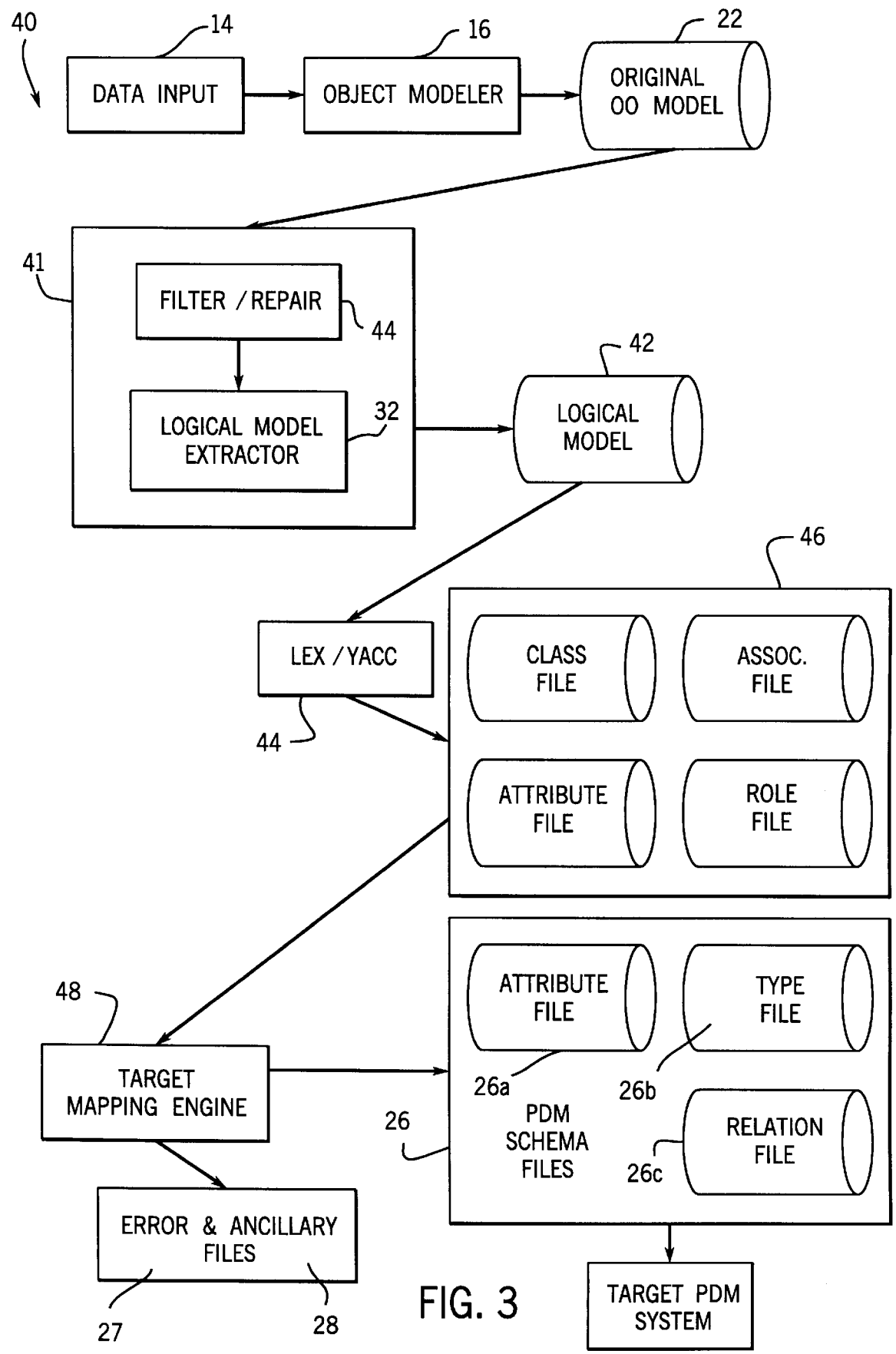
FIG. 3 is a flow diagram illustrating the methodology associated with the database constructor FIG. 1.

FIG. 3 is a block schematic diagram 40 showing the database construction system, and particularly the system compiler 20, of the present invention in more detail. As shown, the object modeler 16 receives input from the data input 14 and generates an original (OO) model 22. Files from the (OO) model are then input into the compiler 20, which is programmed to generate a logical model 42 from the (OO) model 22. The compiler 20 generates the logical model 42 by filtering/repairing the peculiarities detected in the logical model as being generated via software generated filter/repair block 44. The software block 44 filters the presentation layer associated with the input data and the original (OO) model, as the system of the present invention only requires relational data information, i.e., that one object is related to other input data in a hierarchial manner. After the presentation layer is stripped from the (OO) model, the logical model extractor 32 then extracts the logical model 42. Both the filter/repair block 44 and the logical model extractor 32 are software implemented. A pseudo code representing the logic used to implement the block 44 and the extractor 32 is shown in the pseudo code attached as Appendix A.

The resulting logical model 42 is then input into a software utility block 44 compiler. The software utility, which is preferably commercially available software utilities such as Lex (Lexical Analyzer) and/or Yacc (yet another compiler compiler), uses context free grammar to parse the logic contained in the logical model to generate files, such as class filed, association files, attribute files and roll files, as indicated generally in the file block 46. After the software utility block 44 generates the file block 46, the files from the block 46 are input into a compiler target mapping engine 48. The target mapping engine 48 then maps the general class files 46 into more specific application schema files, as indicated at 26. Particularly, these schema files are PDM schema files, which are ultimately output to target PDM system for use in the PDM platform. Target mapping engine 48 also generates error and ancillary files 27, 28 from the general class files, that will enable the system operator to detect database errors before implementation of the PDM system. As with the compiler software block 41, the target mapping engine 48 is software implemented through logic, such as that illustrated in the computer pseudo code attached in Appendix A.

Figure 4:
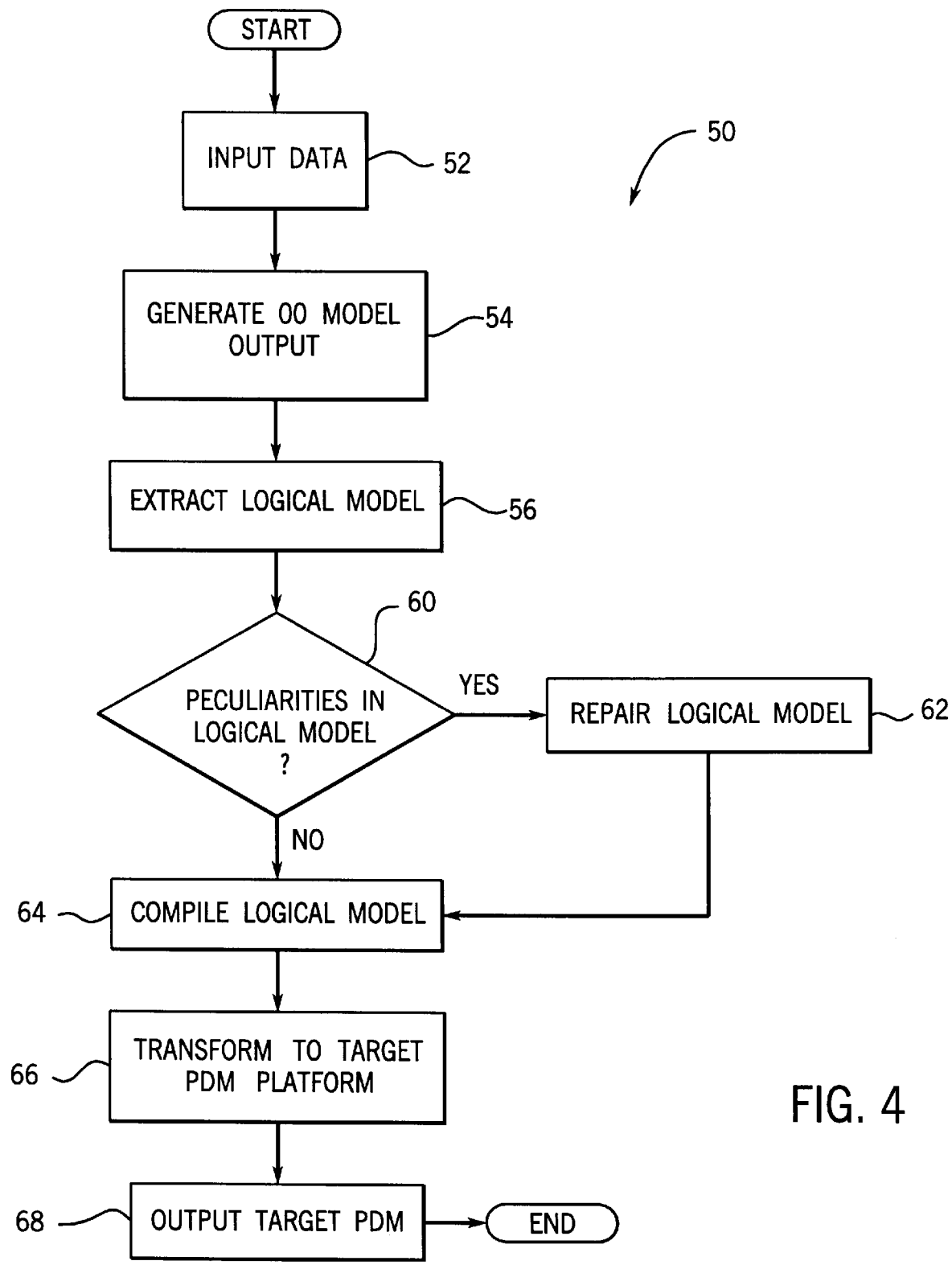
FIG. 4 is a block schematic diagram of the database construction system shown in FIGS. 1–3.

Referring to FIG. 4, a flow diagram summarizing the methodology of the system of the present invention is shown at 50. At 52, data indicative of relationships among various objects to be related in the database schema is input through the input 14. At 54, the object modeler 16 generates an object oriented model, and outputs object model files to the compiler 20. At 56, the model extractor 32 extracts the logical model from the object model files input at the input 30. The logical model is defined as only those entities, including associated attributes and methods, and relationships defined among the entities contained in the output from the object modeler. At 56, two tasks are performed. First, the software addresses any peculiarities encountered in the (OO) model outputs. For example, the (OO) modeler generates different outputs based on how the system is used, and repairs the output of the logical model. Second, this step identifies and extracts elements of the logical model. Because the output from the (OO) model often contains information that is not essential to the logical model, this step filters out all non-essential information, such as, for example, font and screen positional information. Preferably, this step is accomplished with a stand-alone Tcl application. As indicated at 60, if peculiarities exist in the (OO) model output, methodology advances to step 62, and the logical model is repaired in response to the noted peculiarities of step 60.

After the logical (OO) model is extracted from the object model output files, the methodology compiles the logical model at step 64. Step 64 is accomplished in two parts. First, because the logical model has a predefined structure and grammar, software utilities, which are preferably Lex (Lexical Analyzer) and Yacc (yet another compiler compiler), which are both commercially available, are initially used to define the logical model grammar. The output of the above software utilities, which conforms to C programming language, is compiled into a stand-alone software module that is used by the compiler 20. The resulting output identifies and tags all entities, relationships among the entities, and associated information, such as object identifiers, names, and multiplicity of associations. Second, step 64 splits the output into several files, such as class and association files, in a form conducive to subsequent processing. The second part of step 64 preferably is implemented in Tcl.

The logical model is subsequently transformed to a PDM schema file at step 66. The software maps the target PDM requirements to logical model data, and detects errors and other inconsistencies. Errors, and warnings of potential errors, are reported to the system user through an error file 27 in FIG. 2. Simultaneously, the PDM schema file is generated for use by the target PDM platform, as shown at 26 in FIG. 2. Further, ancillary target PDM related files such as the files at 28 in FIG. 2, may also be generated in the step to assist in building the PDS platform. For instance, such ancillary files may include revision and incremental PDM schema update information. As with step 64, the software module implementing this step is preferably realized in TCL programming language. The PDM schema file is subsequently output at 68 for use in the target PDM platform.

The above individual processing steps are preferably linked together through a script. Each software module associated with each step is a stand alone application, as the OO/PDM compiler is partitioned into distinct processing steps, thus making troubleshooting and further expansion of the methodology in software development easier.

Referring to FIGS. 5–13, transformation of sample OO models to resulting PDM schema will now be described to further illustrate the system and methodology of the present invention. FIG. 4 illustrates a sample object model file to be transformed into a PDM schema file at 80. In FIG. 4, classes are denoted by square boxes with the class name in the upper section of the box and attributes in the bottom section of the box. There is a generalization relationship among "Product", "Refrigeration", "Valve" and "Actuator" classes as well as among "Actuator", "Pneumatic" and "Electrical" classes. Generalization relationship is also referred as classification relationship in object oriented literature. In this example, super-class "Product" has sub-classes "Refrigeration", "Valve" and "Actuator". "Actuator" is further classified as being either "Pneumatic" or "Electrical". This "Product" class has a "productCode" attribute which characterizes the manufacture code of each product. Similarly, other classes (not shown) have other attributes. The association relationship between the "Valve" and "Actuator" (represented by a line between "Valve" and "Actuator") denotes that a "Valve" can use many "Actuators" and an "Actuator" can be used by many "Valves". The solid balls at the end of the association line further represent the "many" denotation.

Using the object model file 80 in FIG. 4, information contained in the logical portion of the object model is extracted which is referred to as the logical model. The other aspect of the object model deals with the presentation layer, i.e., the display and placement of the classes and relationships on the screen (or paper). Because all the semantics of the model are contained in the logical model, working with the logical model simplifies the down line processing. A portion of the logical model is illustrated at 90 in FIG. 5.

Figure 5:
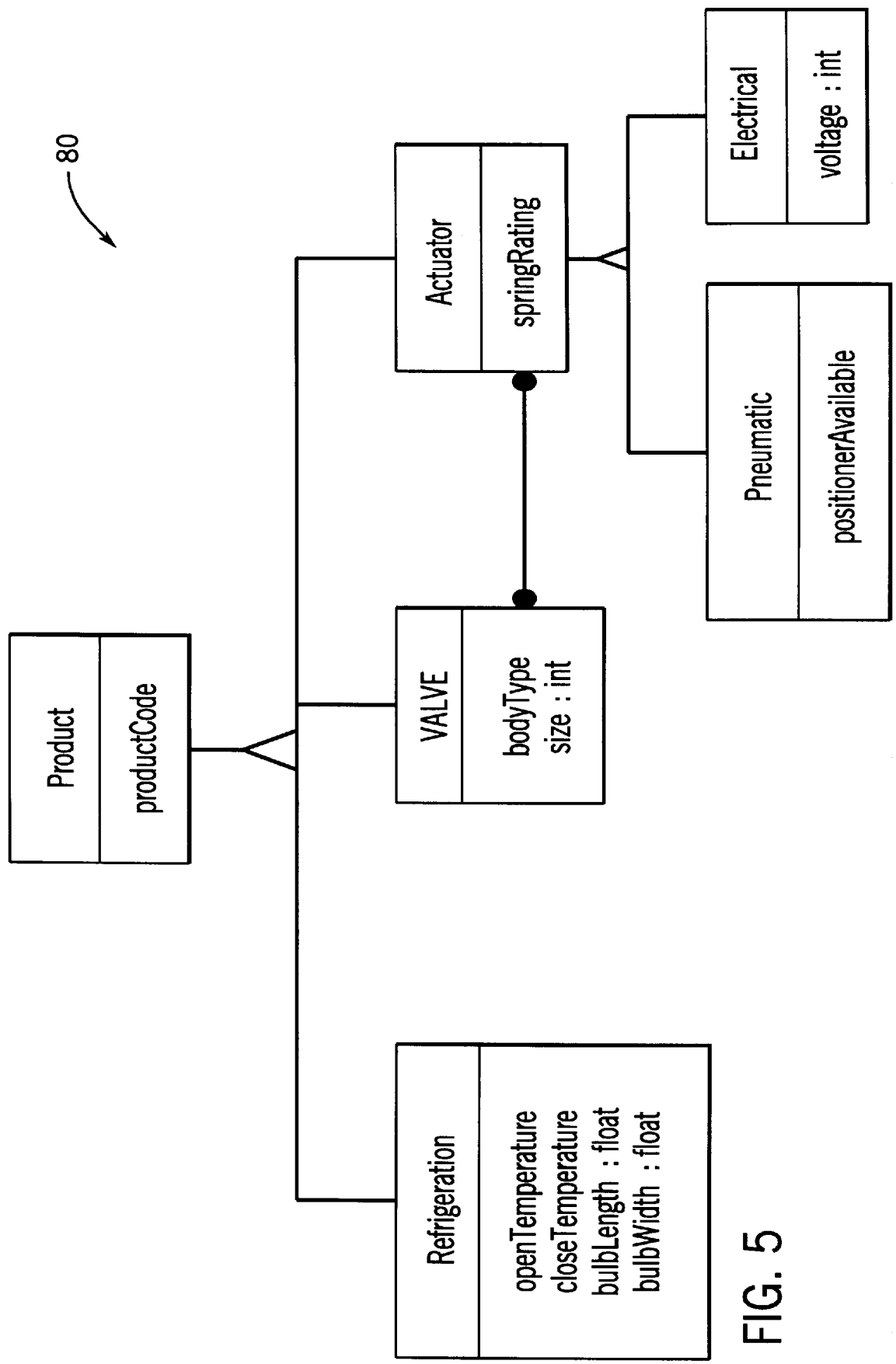
FIG. 5 is a sample relationship diagram of an object model to be converted into a product data manager data base by the methodology of the present invention.

In the next step of processing, a compiler parses the context free grammar associated with the logical model illustrated in FIG. 5 to generate specific files for the classes, attributes, relationships, and roles. The generated class file is shown at 100 in FIG. 6.

In FIG. 6, each row in the class fie describes one class and contains five key fields: ("33B3F64AO164" for "Refrigeration" class), the class name, a description, the reference to the super-class ("33B3F64DO33F" in the "Refrigeration" class) and abstract class indicator, separated with "|" character. If there is no super-class referenced, the fourth field is empty. The last field (abstract class indicator) identifies whether the class can be instantiated. In FIG. 6, no descriptive information is supplied in the original object diagram and no information is supplied as to whether the classes are abstract or not.

The attributes extracted by the OO/PDM compiler are shown in a resulting attribute file at 110 in FIG. 7. Each row of the attribute file has fields separated by "|". These fields are: a key field for the attribute, the attribute name, a description, the class key which the attribute belongs and the domain for the attribute.

To capture the association relationship, two files are used: one to address the association itself and the other to address the ends of the association, i.e., a multiplicity file and a role file. Since there is only one association in FIG. 4, only one row exists in the association file, as shown at 120 in FIG. 8. The format follows other file formats described previously: a key field, name of the association and a description, separated by "|". Note that there is no association name supplied, and the Rational Rose software supplies a default name ("$UNNAMED$O").

The role file is shown at 130 in FIG. 9. Because there are two ends to the single association in the object diagram, there are two rows in the role file. Each row includes five fields, with each field being separated by the "|" character: a key that identifies the role, the name of the role, the multiplicity, the class key to which the role is attached, and the key reference to the association. Note that the "many" multiplicity designation is represented as "0 . . n" by Rational Rose.

Transformation of the object diagram to the target PDM schema file is accomplished by taking information contained in the files and generating the appropriate schema information appropriate for the target PDM. The Matrix PDM product from Adra Systems, Inc. is used for the exemplary target PDM. The generated Matrix attribute file is shown at 140 in FIG. 10, which conforms to the Matrix syntax. For example, because Matrix requires a globally unique attribute name, all attribute names are prepended with the class name to insure uniqueness. Furthermore, for those attributes that have unspecified domain, the default domain "string" is used.

The Matrix type (analogous to class) and relation (analogous to association) files are shown at 150 in FIG. 11 and at 160 in FIG. 12, respectively. The proper syntax required by Matrix for super-class, sub-class relationship (DERIVED key word) is supplied. In addition, proper sequencing of super-class and sub-classes, as required by the Matrix product, is also maintained. That is, a super-class type is created before a sub-class type can reference its super-class type. In our example, as shown in FIG. 11, "Actuator" is defined (through the ADD TYPE "Actuator" statement) before either "Electrical" or "Pneumatic" types are defined (again, through the ADD TYPE "Electrical" and ADD TYPE "Pneumatic" statements). For associations, translation of the multiplicity from Rational Rose convention to Matrix notation (CARDINALITY n) is made.

Finally, a log file summarizing all the errors and warnings detected during the compilation from the object diagram to the target PDM schema is created as described above and is shown at 170 in FIG. 13.

As can be appreciated from the foregoing description, the transformation system and method of the present invention allows an object model to be transformed into the database format in the manner that permits the system operator to note, and address, inconsistencies in the object files. Thus, consistency may be maintained between the OO models and the PDM schema, and the transformation process may be further defined through the use of the associated ancillary outputs generated by the system and method of the present invention. The transformation system and method of the present invention also transform an object model to an implementation specific file in an accurate and user-friendly manner that allows a database designer to focus on the conceptual aspects of database design rather than on database implementation.

I claim:

1. A method of constructing a database, comprising the steps of:
   generating an object relationship model;
   extracting a logical model from the object relationship model that includes:
      compiling the logical model into recognizable entities and relationships having a pre-defined grammar context; and
      transforming the compiled ogical model into a hierarchial model of context-free grammar schema files for use in a database system.

2. The method of claim 1, wherein the step of extracting a logical model from the object relationship model comprises the step of compensating for structural inconsistencies in the object relationship model.

3. The method of claim 2, wherein the step of compensating for structural inconsistencies in the object relationship model comprises filtering object relationship model information that is not essential to the step of compiling the logical model.

4. The method of claim 1, wherein the step of extracting the logical model from the object relationship model comprises the step of identifying elements of the logical model; and
   extracting the identified elements from the logical model for use in the step of compiling the logical model.

5. The method of claim 1, wherein the step of compiling the logical model comprises the step of identifying all entities, relationships and associated information; and
   creating files from the entities, relationships and associated information for use in the step of transforming the compi ed logical model to the hierarchial model.

6. The method of claim 1, wherein the step of transforming the logical model to the hierarchial model comprises the step of mapping information in the logical model to the hierarchial model.

7. The method of claim 1, further comprising the step of detecting errors and generating error warnings during the step of transforming the compiled logical model to the hierarchial model.

8. The method of claim 1, further comprising the step of generating ancillary database files that assist in building the target database platform.

9. The method of claim 1, wherein the step of transforming the compiled logical model to a hierarchial model comprises the step of transforming the compiled logical model to a plurality of context-free grammar product data manager files for a target product data manager platform.

10. A method of transforming graphical object oriented models into a product data manager database platform, comprising the steps of:
    generating an object oriented (OO) model output;
    extracting a logical (OO) model from the step of generating an (OO) model output;
    determining if structural inconsistencies exist in the logical (OO) model;
    compensating for the structural inconsistencies;
    compiling the logical (OO) model into recognizable entities and relationships; and
    transforming the compiled logical (OO) model to a target product data manager (PDM) platform.

11. A database generator, comprising:
    a data input through which input data indicative of relationships among objects is input;
    an object modeler in communication with the data input that generates an object model of the database from the data;
    a compiler connected to the object modeler that transforms the object model of the database into a hierarchial model; and
    a data output that outputs the database hierarchial model for implementation purposes.

12. The database generator of claim 11, wherein the compiler generates, and the data output outputs, error and warning files indicative of inconsistencies detected by the compiler during transformation of the object model into the database hierarchial model.

13. The database generator of claim 11, wherein the database output further outputs database platform dependent ancillary files that help to further define the database hierarchial model.

14. The database generator of claim 11, wherein the database hierarchial model comprises a product data manager schema files for a product data manager platform.

15. The database generator of claim 11, wherein the compiler comprises:
    a filter that filters presentation layer data from the input data; and
    a logical model extractor that extracts a logical model from the output model, the logical model containing grammar to be parsed to general class files by the compiler.

16. The database generator of claim 15, wherein the compiler further comprises a software block that parses the logical model grammar into a plurality of context-free grammar class files.

17. The database generator of claim 16, wherein the compiler further comprises a target mapping engine that maps the class files to a plurality of database schema files that comprise the database hierarchial model.

* * * * *